Figures 1, 2:
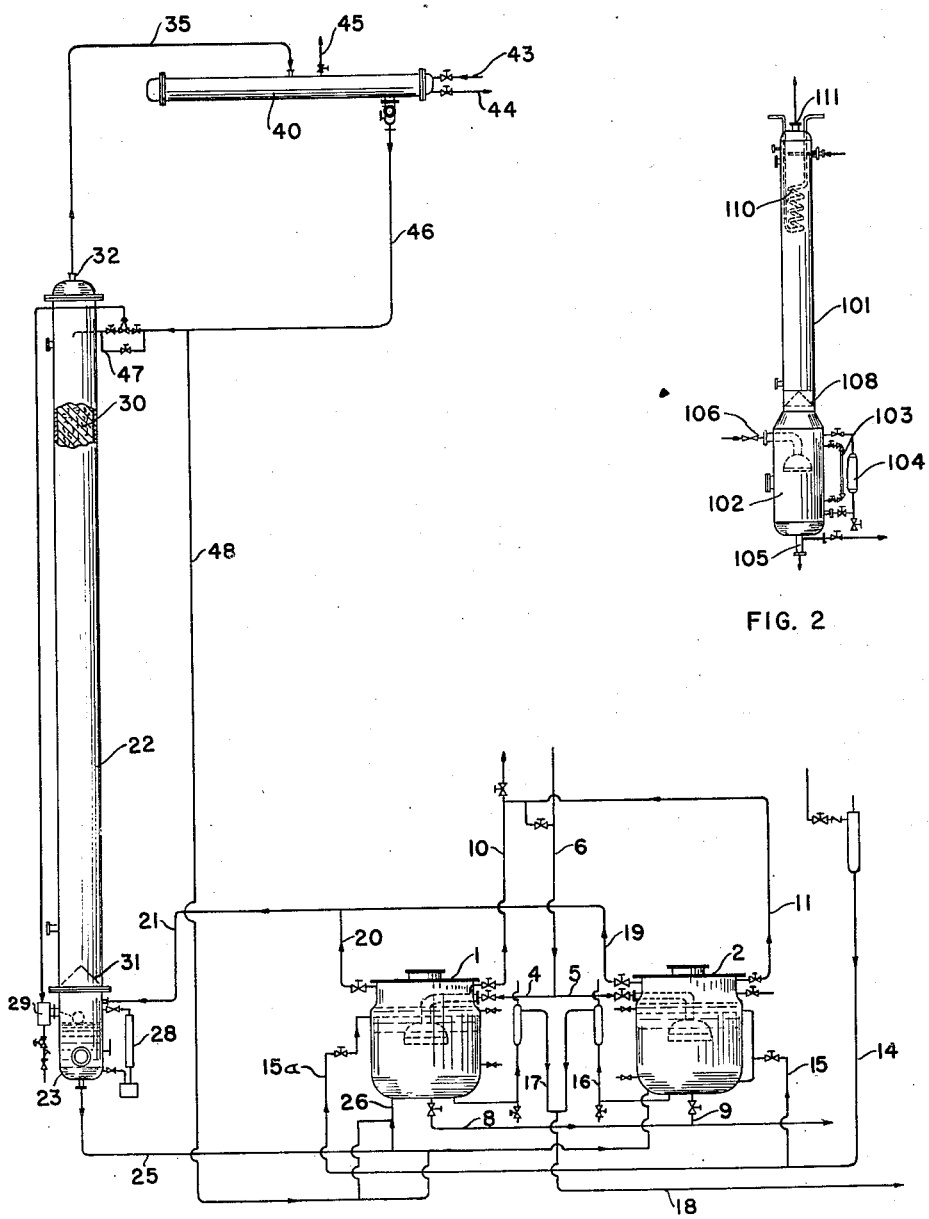

Jan. 25, 1955  R. C. SUTTER  2,700,431
PURIFICATION OF CHLORINE
Filed May 16, 1952

INVENTOR.
ROBERT C. SUTTER
BY

United States Patent Office 2,700,431
Patented Jan. 25, 1955

2,700,431

PURIFICATION OF CHLORINE

Robert C. Sutter, Houston, Tex., assignor to Diamond Alkali Company, Cleveland, Ohio, a corporation of Delaware Application May 16, 1952, Serial No. 288,113

6 Claims. (Cl. 183—115)

This invention relates to the treatment of chlorine gas to separate organic and other impurities therefrom and, more particularly, to a method and apparatus for removing impurities from chlorine gas by extraction with liquid chlorine.

Nowadays, most chlorine gas is produced commercially by electrolysis of an aqueous brine solution. This process produces a chlorine gas containing a fair proportion of water vapor, air and carbon dioxide in addition to a small amount, usually of the order of 1% by weight, of various organic materials, of which chloroform, carbon tetrachloride and hexachloroethane are the most frequently encountered. The water vapor can be removed from the gas by cooling and well-understood concentrated sulfuric acid treatment, but this procedure is not effective to remove the other gases and organic impurities. In fact, the sulphuric acid treatment produces, by reaction with the unwanted impurities, complex sulfonated and other sulfur-containing compounds, the removal of which is also essential to ultimate chlorine gas of commercial purity.

Industrial chlorine is usually handled in liquid form for ease of storage and transportation. As the condensation conditions to which it must be subjected in order to place it in the liquid form are equally effective for the impurities of the same or less volatility than chlorine itself, unless the chlorine is subjected to treatment prior to condensation, which treatment reduces the concentration of these impurities to a practicable low level, trouble will be encountered in the condensing equipment, particularly from fouling of condenser surfaces by deposition of solid impurities thereon, as well as plugging of valves and other instrumentalities for controlling movement of the liquefied material by the same solidified impurities.

In addition, the transportation of chlorine is simplified by advance removal of these impurities. Portable steel pressurized containers are employed for this purpose and the gas is obtained by vaporization of the liquid as it is withdrawn from the containers. In order to insure uniform purity of the gas and avoid possible clogging of the container's valves, it is essential that the chlorine be freed from impurities prior to liquefaction. Thus, unreasonable maintenance expense is best successfully avoided by treatment of the gaseous material prior to condensation.

It has been proposed heretofore that these impurities be removed by passing the chlorine gas from electrolytic cells upwardly through a scrubbing tower provided with a refrigerating coil effective to condense a portion of the gas to liquid chlorine and with heater means at the bottom. The refrigerating coil is placed at the upper portion of the scrubbing tower, and thus chlorine liquefied at the coil descends countercurrently through the ascending gas and acts as a scrubbing liquid therefor.

This method has several disadvantages. The temperature of the chlorine gas is of necessity raised well above that necessary for vaporization and thus ultimately the expense of so heating the chlorine is wasted as the gas must in any case be liquefied. Also, the efficient operation of the tower is sensitive to variations in the amounts of chlorine liquefied. Since all of the liquid chlorine is obtained by liquefaction of gaseous chlorine passing therethrough, and the amount of chlorine liquefied fluctuates with variations in the rate of chlorine gas flow and with the temperature of the chlorine gas, at times an insufficient amount of chlorine may be liquefied to remove all of the impurities, while at other times the tower may be flooded.

In accordance with the instant invention, these objections are overcome by first conducting the chlorine gas containing organic and other impurities through a bath of liquid chlorine, and then passing it through the scrubbing tower. The impurities contained in the chlorine are initially extracted in the liquid chlorine bath which may be regarded as one plate of a plate-scrubbing tower and which serves the important function of extracting the bulk of the impurities. Moreover, the temperature and pressure of the chlorine flowing into the tower can readily be controlled within a narrow range. In this way, the subsequent flow of the chlorine gas countercurrently to the flow of liquid chlorine is rendered more efficient, for the temperature of the chlorine gas can be kept low enough, even approximating its boiling point, without evaporating any appreciable quantity of liquid chlorine in passing through the scrubbing tower, which may suitably be a packed section of an extraction tower or its equivalent. Assurance is thus available that the remainder of the impurities are removed in the tower treatment. Also, the amount of chlorine condensed in the cold top of the tower can be kept within very narrow limits.

In accordance with the present invention, it is not necessary to provide a refrigerating coil in the scrubbing tower, although this forms one embodiment of the invention. It is also possible to condense the chlorine gas emerging from the tower at a point removed from the tower and conduct this liquid chlorine into the tower at one end thereof in lieu of the refrigerating coil. This mode of operation removes any remaining uncertainties in the amount of chlorine liquefied and permits countercurrent extraction of the gaseous chlorine with a steady controlled flow of liquid chlorine at a regulatable temperature.

It may be noted that the bath of liquid chlorine may be located at the bottom of the tower or in a tank removed from the tower, from which the chlorine gas is then conducted to the tower; in either case, the chlorine is introduced below the surface of the bath. In order to insure good continuous operation, means are provided in all forms for suitable start-up procedure and suitable continuous operating procedure, which means insure that at no time shall impure gas be brought into the system except below the surface of a liquid chlorine bath. Each of the embodiments possesses particular advantages, as will be evident from the description which follows.

Preferably, the scrubbing tower through which the excess chlorine is passed countercurrently to the flow of liquid chlorine is packed with a suitable packing material for more intimate contact between the gaseous and liquid chlorine.

The process of the invention can be carried out by apparatus of which two typical embodiments are diagrammatically illustrated in the drawings, in which Fig. 1 represents one embodiment in which the bath of liquid chlorine is held in a sludge tank spaced from the tower;

Fig. 2 represents another embodiment in which the bath of liquid chlorine is held in a chamber at the bottom of the tower and gaseous chlorine is condensed by means of a refrigerating coil at the top of the tower.

It will be seen that a continuous purification process can be carried out in either of the embodiments illustrated in the drawings by first supplying liquid chlorine to the bath containing means, then passing chlorine into the bath of liquid chlorine in superheated condition, whereby it is scrubbed by the liquid chlorine, releases its heat and thus causes evaporation of some of the pool of liquid chlorine, maintaining the proper level of liquid chlorine in said bath, and purging liquid chlorine therefrom from time to time as may be required to remove impurities, passing chlorine emerging from the bath continuously into the stripping tower or column, furnishing thereto at or near the top of the tower, the amount of liquid chlorine required for countercurrent extraction, for example, by maintaining the refrigerating coil at the proper temperature or by returning a sufficient quantity of liquefied chlorine from condensing means outside the chamber, and recovering purified gaseous chlorine from the top of the tower while liquid chlorine is continuously sent from the bottom of the tower to the bath where impurities are removed therefrom, the baths being intermittently purged.

In Fig. 1, a pair of sludge tanks for liquid chlorine is shown at 1 and 2. The sludge tanks are provided with inlet pipes 4 and 5 for introduction of gaseous chlorine from pipe 6 leading back to sulfuric acid mist traps or the like. The inlet pipes 4 and 5 at the interior of the sludge tanks dip below the level of liquid chlorine. Pitted at the bottom of the tanks are pipes 8 and 9 for draining contaminated liquid chlorine therefrom when replacement is required. Vents 10 and 11 are provided at the top of each tank for a purpose to be described but are usually maintained closed to the atmosphere. The tanks may suitably be provided with convenient means of heating the same and are preferably well-insulated. An example of a convenient means of providing for heating the tanks is to provide the same with a liquid temperature regulating system through which hot or cold water can be circulated, the system consisting of the inlet pipes 14 and 15 and 15a, and the outlet pipes 16, 17, and 18, suitable valving being included to permit temperature regulation of either tank at any one time.

As will be described hereinafter, it is necessary from time to time to fill tanks 1 or 2 with liquid chlorine. This may be accomplished by suitable adjustment of valves in line 48, which connects line 46 with lines 25 and 26.

The chlorine gas outlet pipes 19 and 20 lead from the tops of the sludge tanks to the bottom of the scrubbing column or tower 22. The column has a well 23 at the bottom for receiving liquid chlorine descending therein, and this well is connected by the pipes 25 and 26 to the bottoms of the sludge tanks 1 and 2. A sight glass 28 permits the operator to observe the level and condition of the liquid chlorine in the well, and the liquid level controller 29 controls the level of chlorine in the well.

The column is furnished with packing 30, such as Beryl saddles or the like, supported on the grid 31 for insuring intimate contact between the gas and liquid.

The chlorine gas outlet 32 shown at the top of the column connects pipe 35 which leads directly into a condenser 40 provided with a system for circulation of cooling brine via inlet pipe 43 and outlet pipe 44. Outlet pipe 45 delivers gaseous chlorine from the system, and outlet pipe 46 connects the condenser, as above noted, with the tanks 1, 2 through line 48, and with the top of the tower at 47, delivering liquid chlorine for flow descending countercurrently to the upwardly flowing gaseous chlorine.

In operation, one of the sludge tanks is continuously in operation whilst the other is down for cleaning out, so that the process can be operated continuously. Initially, a sludge tank 1 or 2, to be put in service after cleaning, is filled as through line 48 with purified liquid chlorine. Superheated chlorine gas enters the thus-filled sludge tank 1 or 2 through pipes 4 or 5. The chlorine is brought quickly to a low temperature upon passage through the cold liquid chlorine, and a large proportion of the impurities is extracted therefrom in this stage of the process. Moreover, by conducting this initial purification in a tank separate from the column 22, it is insured that no contact ever occurs between the packing in the column and the raw feed gas. As the chlorine is superheated when it enters the sludge tank, some of this heat goes to evaporating the liquid chlorine in the tank.

While it is, of course, theoretically possible to initiate purification without first filling a sludge tank with liquid chlorine and merely introducing the gaseous chlorine to be purified below the surface thereof, this method of start-up procedure is undesirable as superheated chlorine will then be introduced directly into tower 22 and the packing in the lower part of the tower will tend to have deposited thereupon the impurities in the chlorine which tend to bake and solidify thereon and are extremely difficult to remove.

The cooled and initially purified gas emerges from the sludge tank at 19 or 20 and enters the bottom of the column through the inlet pipe 21. As the gas passes upwardly through the column, it contacts the liquid chlorine descending through the tower and is effectively freed of organic impurities which are extracted therefrom and carried to the bottom of the column by the liquid chlorine. The temperature and pressure within the column are controlled to hold a major proportion of the organic impurities in the liquid chlorine, and inhibit evaporation of liquid chlorine descending through the tower.

The gaseous chlorine, after being purified by the extracting action of the liquid chlorine, passes out of the column at 32 and enters the condenser 40 where a portion thereof is condensed as may be required by the demands of the system for return to the column through the pipe 46, entering the column at the inlet pipe 47. Uncondensed purified chlorine gas leaves the system at 45.

The liquid chlorine containing the organic impurities separated from the gas is drawn off through the drain 25 and sent to the sludge tanks, wherein its content of organic impurities can be considerably increased before it becomes necessary to discard the material through drains 8 or 9.

It is evident that liquid chlorine employed in the process can be furnished from any source, and in order to start the system in operation, it will of course be necessary to furnish a minimum amount of liquid chlorine to a sludge tank and to the column. Thereafter, sludge tanks, as alternately put in service, may be supplied with liquid chlorine through line 48. While there is no need to send liquid chlorine containing organic impurities from the bottom of the column to the sludge tanks, for economic reasons, this will usually be done in a commercial process. In any case, and as described above, make-up of liquid chlorine in the sludge tank which is in operation is essential to replace that part of the liquid chlorine evaporated by the superheated entering chlorine.

When a tank 1 or 2 becomes too clogged with solid or semi-solid impurities for further operation, valve adjustments are made to place the second tank in service, the same having already been filled with pure liquid chlorine as through line 48. The shut-down tank may then be cleaned by applying a vacuum at the appropriate vent 10 or 11 until all gaseous or vaporizable constituents are removed, after which the appropriate dump line 8 or 9 may be opened whereby, since the system is maintained under pressure, the remaining liquid or semi-solid impurities will be blown to waste. The cleaned tank may then be filled with pure liquid chlorine and is ready for use when needed.

A preferred means of cleaning the sludge tanks is simply to open the tank to be purged to line 21 and permit all vaporizable materials to go to tower 22, whereupon the action in the tower and the other sludge tank in service will result in purification of the chlorine in these so purged gases. Heating of the tank is preferably resorted to to insure recovery of all chlorine therefrom. When all gaseous materials have been removed, the liquids and semi-solids in the tank being cleaned may be sent to waste as before.

In a preferred example, with a column approximately 16 inches in diameter and packed with 20 feet of Beryl saddles, 1 inch size, and with 200-gallon capacity sludge tanks, chlorine gas is admitted into one of the sludge tanks at a pressure of 35 p. s. i. g. and a temperature of 120° F. at a rate of 180 cubic feet per minute. The temperature of the liquid chlorine in the sludge tank is such that the gas, which emerges at about the same rate and pressure, has a temperature of 28° F. This gas enters the column and emerges at the upper end thereof at the rate of 172.9 cubic feet per minute at 28° F. Approximately 17% of the gas is condensed in the condenser and returned to the column. The remainder leaves the system, emerging at a rate of 144.5 cubic feet per minute and a temperature of 28° F.

Under these conditions, in a period of 24 hours, approximately 70 tons of chlorine are purified in the described apparatus.

By the process, a gas containing 99.999% by weight chlorine may be obtained even though the so-called impure gas contains 99.9% or more by weight of chlorine. It will be noted that substantially no chlorine is lost in the process and no diluted gas is formed or added in the process.

In Fig. 2, a suitable scrubbing column is shown at 101, furnished with a suitable well 102 for holding a reservoir of liquid chlorine. The well is furnished with a sight glass 103 and a level control 104. A drain pipe 105 is fitted at the bottom of the well. An inlet pipe 106 is provided which dips below the level of liquid chlorine in the well at the bottom of the column. The column is preferably filled with a suitable packing which may be supported by the grid 108.

The refrigerating and condensing system includes a coil 110 for circulation of brine or the like at the top of the column. The purified chlorine gas leaves the system through the exit pipe 111.

In operation, superheated chlorine gas enters the column at 106 and is introduced into the reservoir of liquid chlorine in the well 102 below the level of liquid chlorine therein, where its temperature is rapidly lowered and a large proportion of the impurities is extracted by the liquid chlorine. Cooled gaseous chlorine passes upwardly through the column countercurrently to the liquid chlorine descending therethrough, and eventually reaches the refrigerating coil 110, where a portion of the gas is liquefied. The coil is maintained at a temperature to reduce a portion of the gas to the dewpoint at the existing pressure. Excepting only an initial charge of liquid chlorine to provide the bath in well 102, all chlorine in liquid form necessary to replace that evaporated by contact with superheated gaseous chlorine in well 102 is produced by condensation at the coil 110 and as condensed, descends through the tower and scrubs ascending vaporized gas. Purified gaseous chlorine passes out of the system at 111, while the liquid chlorine containing impurities is withdrawn from time to time through the drain 105.

It will be seen that a continuous purification process can be carried out by passing chlorine into the system continuously at 106, furnishing the required amount of liquid chlorine thereto by maintaining the refrigerating coil at the proper temperature to liquefy the necessary amount of gas and removing the liquid chlorine containing impurities at the bottom of the column through the drain 105.

It will be understood that it is not necessary that all of the liquid chlorine be obtained through use of the refrigerating coil. It would also be possible to utilize a liquid condenser of the type illustrated in Fig. 1, the chlorine gas emerging at 111 passing directly into the condenser, whence liquid chlorine is returned directly to the system, entering at its top, as in Fig. 1.

In a preferred example of this embodiment of the invention, in a column about 18 inches in diameter with about 8 feet of packing rings and fitted with a refrigerating coil of 1½ inch diameter pipe, the chlorine gas is admitted at a temperature in the neighborhood of 95° F. and a pressure of 30 to 40 p. s. i. g. at a rate of 172 cubic feet per minute. The temperature of the coil, 6° F., is such that about 15%–17% of the chlorine passing thereover is liquefied and the temperature of the purified chlorine gas leaving the column is about 28° F. The system is capable of producing 70 tons of gaseous chlorine per day. The liquefaction of from 15% to 20% by weight of the chlorine is sufficient to purify the chlorine passing through the tower. A chlorine approximately 99.999% by weight can be obtained.

It is obvious that a continuous purification process can be had if the chlorine gas is passed continuously into the column at a point below the liquid level of the pool, and is cooled there with consequent evaporation of some of the liquid chlorine therein. The required amount of liquid chlorine to replace this evaporation is furnished continuously by condensation of purified gas and returned to the system at the top of the column, from whence it descends to the pool while scrubbing ascending gas, and the liquid chlorine containing impurities is continuously withdrawn to the impure liquid chlorine-recovering tank at the rate at which liquid chlorine falls downwardly through the column less the replacement necessary for evaporation in the well. It will be noted that the only chlorine lost in the system is that which may be occluded with the impurities drained from the impure chlorine tank.

It will be evident to those skilled in the art that considerable modification is possible in the temperatures and pressures employed and in the amount of chlorine liquefied by changing the dimensions and capacities of the system, but all of these modifications come within the scope of the invention.

It will usually be convenient to maintain the temperature of the liquid chlorine into which the chlorine gas is first plunged at a temperature within the range from 28° to 29° F. In order to do this, it may be necessary to adjust the temperature and volume of liquid chlorine required, depending upon the rate of flow, temperature, pressure of the entering liquid chlorine, and amount of impurities in the impure liquid chlorine.

The countercurrent stripping of gaseous chlorine should be carried out while the chlorine gas is substantially at a temperature of the boiling point of chlorine at the operating pressure, which is conducive to condensation of impurities contained therein. Low temperatures of the chlorine gas will ensure that vaporization of liquid chlorine in the column is held at a minimum and thus hold the amount of liquid chlorine available for the scrubbing action at a maximum.

Other modifications will be evident to those skilled in the art, and it will be understood that all modifications coming within the scope of the following claims but not specifically described are within the scope of the invention.

All parts and percentages are by weight.

What is claimed is:

1. A process for purifying chlorine from organic impurities which comprises conducting gaseous chlorine through a body comprising liquid chlorine contained in a sludge tank to effect removal of heavy impurities and then flowing the gas countercurrently to a flow of liquid chlorine in a column, and recovering the purified gas.

2. A process for purifying chlorine from organic impurities which comprises conducting superheated gaseous chlorine through a body comprising liquid chlorine contained in a sludge tank to cool said superheated chlorine, while evaporating some of the liquid chlorine in said tank, flowing the gaseous chlorine obtained from said tank in countercurrent relation to a flow of liquid chlorine in a column, and recovering the purified gas from said column.

3. A process for purifying chlorine from organic impurities which comprises conducting gaseous chlorine through a body comprising liquid chlorine contained in a first sludge tank to evaporate some of the liquid chlorine in said tank and scrub out organic impurities from said gaseous chlorine, continuing said conducting until the liquid chlorine remaining in said tank is substantially saturated with said organic impurities, then conducting gaseous chlorine through a second body comprising liquid chlorine in a second sludge tank while cleaning said first tank of its impurity-saturated liquid chlorine, and continuously flowing the gas obtained from each of the said tanks countercurrently to a flow of liquid chlorine in a chlorine tight column remote from said tanks, and recovering purified chlorine gas from said column.

4. The method as claimed in claim 3 wherein the level of liquid chlorine in either of said tanks is maintained constant while said gaseous chlorine is being introduced thereinto.

5. The method as claimed in claim 3 wherein said tanks are initially filled with liquid chlorine prior to passage of impure gaseous chlorine thereinto.

6. The method as claimed in claim 3 wherein liquid chlorine flowing in said column is employed to maintain the liquid chlorine level in said tanks.

References Cited in the file of this patent

UNITED STATES PATENTS 2,318,512    McHaffie _____ May 4, 1943